US012763963B2

(12) United States Patent
Gu et al.

(10) Patent No.: US 12,763,963 B2
(45) Date of Patent: Oct. 13, 2026

(54) BLOCKCHAIN ADDRESS MANAGEMENT FOR MORE EFFICIENT BLOCKCHAIN NETWORKS

(71) Applicant: Circle Internet Group, Inc., Boston, MA (US)

(72) Inventors: Huawei Gu, Boston, MA (US); Ramazan Mert Cinar, Boston, MA (US)

(73) Assignee: Circle Internet Group, Inc., Boston, MA (US)

( * ) Notice: Subject to any disclaimer, the term of this patent is extended or adjusted under 35 U.S.C. 154(b) by 357 days.

(21) Appl. No.: 18/232,308

(22) Filed: Aug. 9, 2023

(65) Prior Publication Data

US 2025/0055698 A1 Feb. 13, 2025

(51) Int. Cl.
*H04L 9/32* (2006.01)
*H04L 9/00* (2022.01)

(52) U.S. Cl.
CPC .............. *H04L 9/3236* (2013.01); *H04L 9/50* (2022.05)

(58) Field of Classification Search
CPC ........ H04L 9/3236; H04L 9/50; H04L 9/3239
See application file for complete search history.

(56) References Cited

U.S. PATENT DOCUMENTS

| | | | | |
|---|---|---|---|---|
| 8,495,197 | B1 * | 7/2013 | Nagargadde | G06F 9/50 709/224 |
| 10,862,859 | B2 * | 12/2020 | Kannan | H04L 9/3247 |
| 11,328,347 | B2 * | 5/2022 | Lim | H04L 9/3247 |
| 2020/0034450 | A1 * | 1/2020 | Layton | G06F 9/54 |
| 2020/0286162 | A1 * | 9/2020 | Liu | G06Q 20/4014 |
| 2022/0200951 | A1 * | 6/2022 | Goel | H04L 61/10 |

FOREIGN PATENT DOCUMENTS

| | | | |
|---|---|---|---|
| CN | 113794789 A | * 12/2021 | H04L 61/5061 |

* cited by examiner

*Primary Examiner* — Sm A Rahman
(74) *Attorney, Agent, or Firm* — Dinsmore & Shohl LLP

(57) ABSTRACT

Certain aspects of the disclosure provide a method for leasing a blockchain address, including receiving a first lease request for a blockchain address configured to receive a blockchain transaction on behalf of a user. The method further includes determining lease states for a plurality of existing blockchain addresses in a blockchain address lease pool and based on the determined lease states, determining whether to lease an existing blockchain address from the blockchain address lease pool or to generate a new blockchain address for the blockchain address lease pool. The method further includes leasing a first blockchain address from the blockchain address lease pool to the first user.

7 Claims, 8 Drawing Sheets

BLOCKCHAIN ADDRESS MANAGEMENT FOR MORE EFFICIENT BLOCKCHAIN NETWORKS

BACKGROUND

Field

Aspects of the present disclosure relate to management of blockchain addresses to improve efficiency of a blockchain network.

Description of Related Art

A blockchain is generally a distributed database or ledger that is shared among nodes of a computer network, and this is sometimes referred to as a blockchain network. Generally, "chain" or "blockchain" may refer to a blockchain network. Blockchains are generally configured to store information electronically in a digital format, such as the record of ownership of an asset (e.g., a cryptocurrency asset). Blockchains may facilitate transactions, such as peer-to-peer transactions of assets.

To effectuate a peer-to-peer transaction on a blockchain, a sending user "transfers" an asset from the user's ownership to a receiving user's ownership. Each user uses a unique blockchain address to send and receive transactions on the blockchain, and may store such an address (and others) in a so-called blockchain "wallet." Information regarding the transaction is recorded onto the blockchain and associated with the user's blockchain address.

Beneficially, in this manner, the transaction is recorded onto the blockchain "ledger" for all blockchain users to observe and verify, which enables secure and trustworthy transactions. However, this record allows tracking of balance and transaction history associated with individual blockchain addresses, which may be undesirable from a privacy standpoint. Thus, it may be desirable for a user of the blockchain to use different blockchain addresses for different transactions to improve privacy, for example, by reducing the ability to of observers to track the user's activity based on a common address.

However, technical problems arise when generating new blockchain addresses for every transaction. First, generating new blockchain addresses requires processing power, as the new blockchain address is generated based on the user's private key, such as through public key cryptography. Thus, generating a large number of new addresses for a large number of transactions is compute, time, and generally resource intensive. Further, each previous blockchain address must generally be maintained, which may require a significant amount of computer storage or time. Second, there is a fee associated with generating new blockchain addresses, as transactions on a blockchain (such as to generate a new address) incur a fee (e.g., gas fee or transaction fee).

Thus, there is a need in the art for improved systems and methods for managing blockchain addresses for users.

SUMMARY

Certain aspects provide a method, comprising: receiving, from a first user, a first lease request for a blockchain address configured to receive a blockchain transaction on behalf of the first user; determining lease states for a plurality of existing blockchain addresses in a blockchain address lease pool; based on the determined lease states, determining whether to lease an existing blockchain address from the blockchain address lease pool or to generate a new blockchain address for the blockchain address lease pool; and leasing a first blockchain address from the blockchain address lease pool to the first user.

Other aspects provide processing systems configured to perform the aforementioned methods as well as those described herein; non-transitory, computer-readable media comprising instructions that, when executed by a processor of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
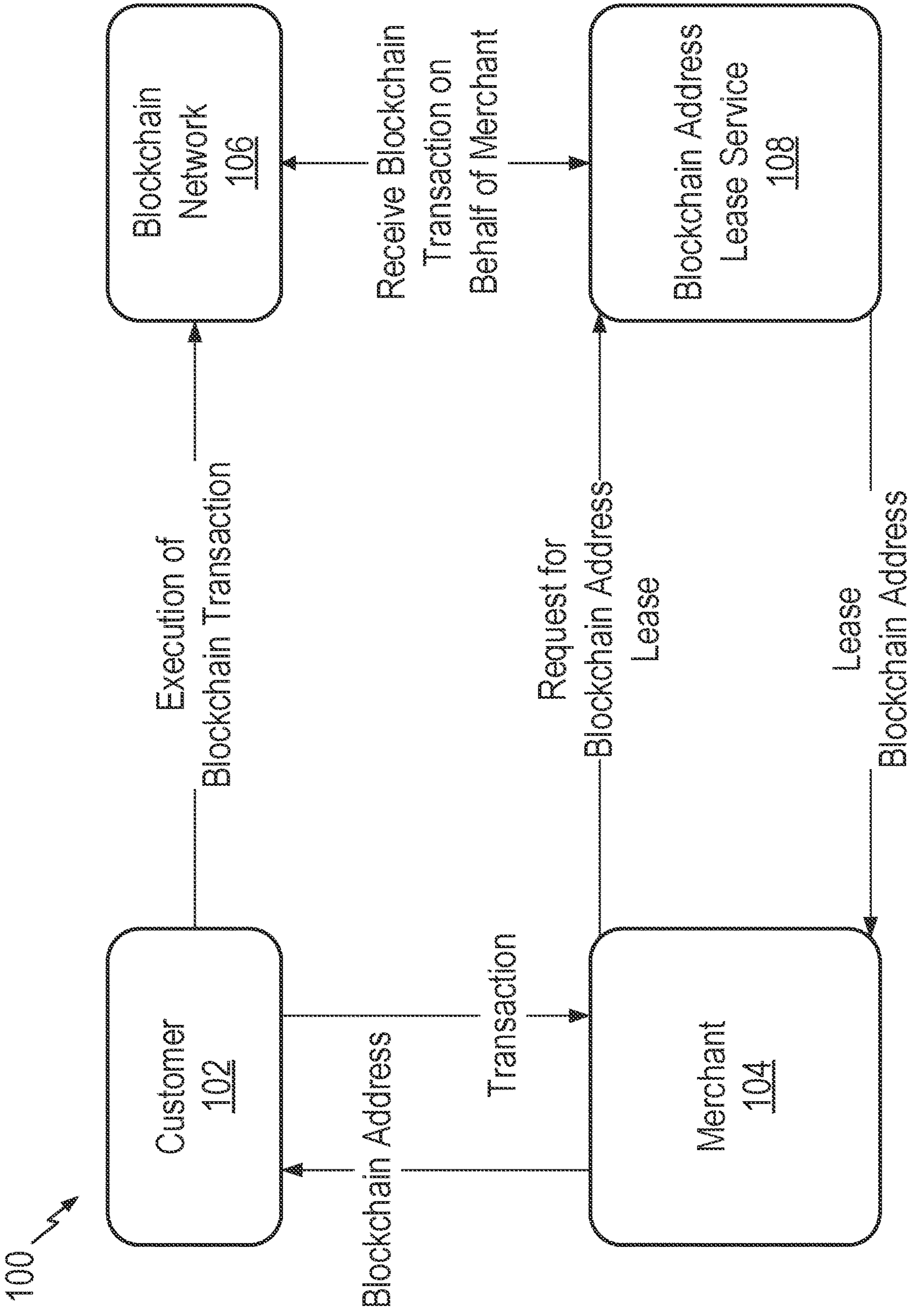
FIG. 1 depicts an example system for managing blockchain addresses.

Aspects described herein provide for systems and methods for managing blockchain addresses in a resource efficient manner, which in turn enables users to leverage multiple blockchain addresses for improved privacy.

As described above, a technical problem exists in the art in which generating new blockchain addresses for new transactions to ensure privacy is resource inefficient, both in terms of use of physical resources, such as processing system compute, memory, power, and time, and in terms of financial resources, such as in regards to blockchain fees. Nevertheless, users, especially those completing a high volume of transactions on a blockchain, desire to generate and maintain many blockchain addresses to avoid, for example, blockchain observers from aggregating transaction information associated with the users.

Aspects described herein provide a technical solution to this technical problem by providing for the creation of and management of leasable addresses that may be utilized by any number of users. Notably, while different users can use different addresses within a lease pool at different times to improve privacy, this need not require creating new addresses, and then idling those addresses, every time the user transacts. Rather, the managed pool of leasable addresses recycles and reuses blockchain addresses following completed transactions. For example, a user may obtain a lease to a blockchain address (in other words, temporary use of the blockchain address) for a new transaction from a pool of available blockchain addresses without needing to generate a new address. Thereby, the user saves the resources conventionally required for obtaining a new address for a transaction, and the blockchain itself is spared an unnecessary transaction, which makes other transactions process more quickly. Once the transaction has completed, the blockchain address is returned to the pool of leasable addresses and may be used again later by other users. Thus, aspects described herein lead to beneficial technical effects, such as reduced use of processing resources, avoided delay in transaction time, more efficient use of the blockchain network, improved privacy, and others as described herein.

In certain aspects, blockchain addresses within a lease pool are assigned a state, wherein in some states, addresses are available for use by different users, and in other states, addresses are unavailable for use. For example, in an "available state" a blockchain address may be available to be "leased" to a user, allowing the blockchain address to be used to perform blockchain transactions (e.g., cryptocurrency transactions) on behalf of the user. In another example, in an unavailable state, a blockchain address may not be leased to another user to ensure there is no overlap in use by different users while a blockchain transaction is pending. Thus, a blockchain address management system may operate like a state machine with respect to managed addresses and enable different addresses to be used by different users at different times, which effectively provides the capabilities of a significantly larger number of unique addresses without the need to create that larger number of unique addresses. The reuse of addresses through a managed state system effectively multiplies the utility of the leased addresses.

Example System for Leasing Blockchain Addresses

FIG. 1 depicts an example system 100 for managing blockchain addresses.

In this example, customer 102 and merchant 104 desire to complete a transaction through blockchain network 106. For example, customer 102 may transfer cryptocurrency to merchant 104, such as to pay for goods or services.

As described above, merchant 104 may desire to use a different blockchain address for each transaction on blockchain network 106 to maintain privacy and avoid observer aggregation of transaction information; however, as above, generating and managing a multitude of blockchain addresses is resource intensive. Instead, merchant 104 leases a blockchain address from blockchain address lease service 108 and uses the leased address for the transaction, and in so doing avoids the resources conventionally used to generate a new blockchain address.

After merchant 104 leases a blockchain address from blockchain address lease service 108, it may complete a blockchain-based transaction using blockchain network 106 (e.g., to receive cryptocurrency from customer 102).

Figure 2:
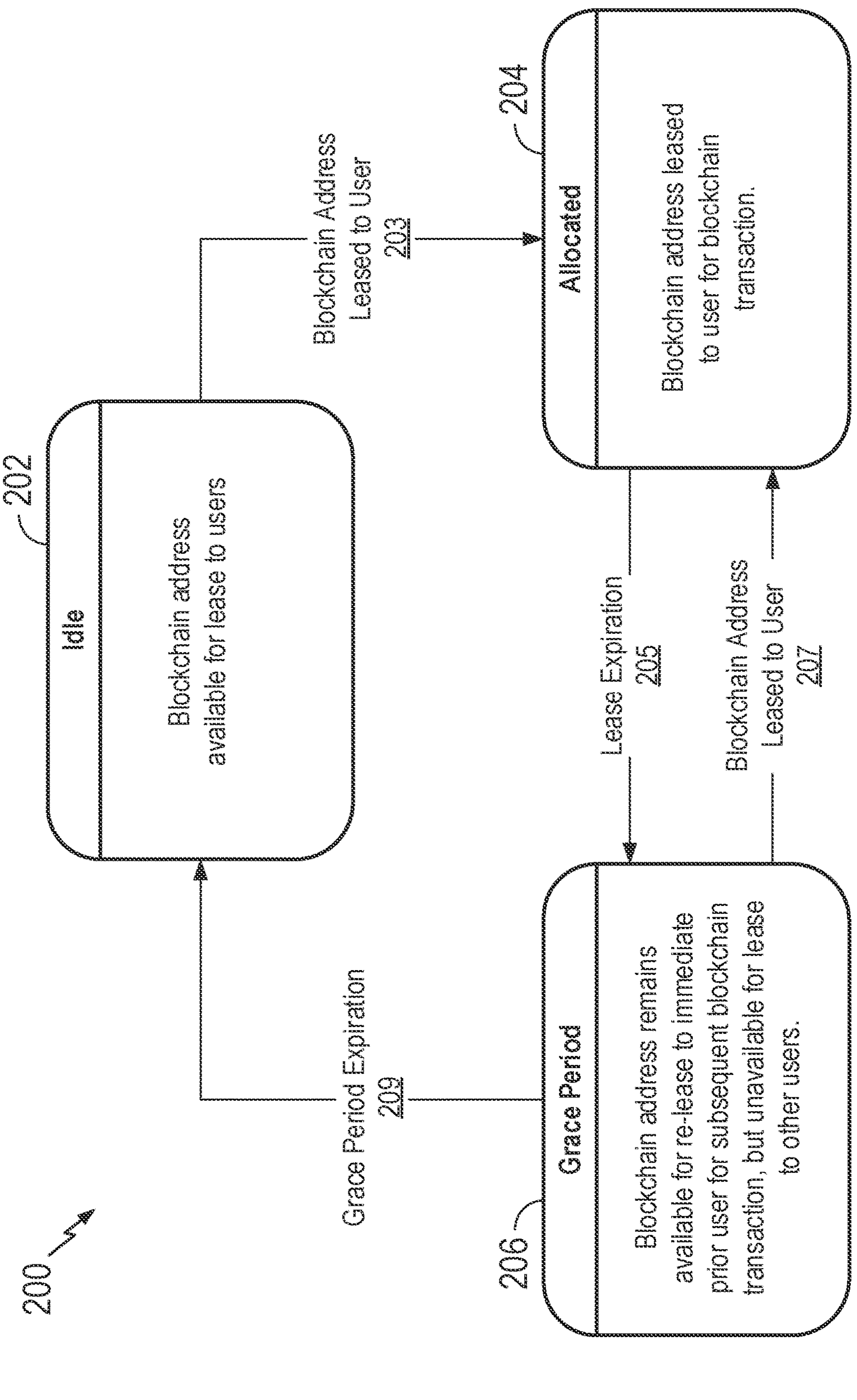
FIG. 2 depicts a state transition diagram between blockchain address states.

Blockchain address lease service 108 maintains a blockchain address lease pool, and as described further with respect to FIG. 2, maintains a state associated with each leasable address. In some embodiments, upon receiving the request for a lease for a blockchain address (e.g., from merchant 104), blockchain address lease service 108 determines if there is an available blockchain address available for lease from the blockchain address lease pool. In some embodiments, this determination is based on the known state of each blockchain address in the blockchain address lease pool. In this example, if a blockchain address is available for lease to merchant 104, then blockchain address lease service 108 provides the blockchain address information to merchant 104 and updates the state of the blockchain address leased to merchant 104. If there is not a blockchain address available for lease to merchant 104, then blockchain address lease service 108 generates a new blockchain address and leases the new blockchain address to merchant 104 and adds the new address to the lease pool such that it can be leased to other users later.

In this example, merchant 104 receives information from blockchain address lease service 108 regarding the leased blockchain address. This information may include the unique ID of the leased address as well as information on the length of the lease. Thereafter, merchant 104 transacts with customer 102 using blockchain network 106 and the leased blockchain address. For example, merchant 104 may receive payment from customer 102 for goods or services via blockchain network 106 using the leased blockchain address.

In some embodiments, blockchain address lease service 108 receives the blockchain transaction at the leased blockchain address on behalf of merchant 104. Blockchain address lease service 108 then allocates the blockchain assets received at the leased blockchain address to merchant 104.

In some embodiments, blockchain address lease service 108 assigns the leased blockchain address to a wallet associated with merchant 104. Merchant 104 receives the blockchain transaction at the leased blockchain address within the wallet.

After the transaction is complete, such as evidenced by receiving the assets at the leased address, the lease of the blockchain address to merchant 104 expires and the formerly leased blockchain address becomes available once again for subsequent leases to merchant 104 or other users. In some cases, the blockchain address may be removed from the wallet associated with merchant 104 after expiration of the lease. Beneficially, then, merchant 104 does not need to maintain a database of blockchain addresses, nor does merchant 104 need to generate a new blockchain addresses for every transaction. Moreover, as merchant 104 uses different leased blockchain addresses for different transactions, privacy is improved and the ability to track the transactions of merchant 104 is reduced.

Example State Machine for Blockchain Addresses

FIG. 2 depicts a state transition diagram 200 between blockchain address states (e.g., idle, allocated, or grace period in this example). Note that in other examples, it is possible to implement additional or fewer blockchain address states. For example, in an alternative embodiment, grace period state 206 may be omitted and/or other states may be added. Generally, the state of a blockchain address may be used to determine whether the blockchain address is available to be leased to users for performing blockchain transactions. In some examples, state transition diagram 200 may be executed by blockchain address lease service 108 in FIG. 1 and/or by aspects of processing system 700, described below with respect to FIG. 7.

As described above with respect to FIG. 1, blockchain address lease service 108 maintains a pool of blockchain addresses for leasing. Each blockchain address in the pool may be associated with a states, such as idle, allocated, or grace period state as in this example. A blockchain address in an idle state (also referred to as an idle blockchain address) is generally one in which the blockchain address is available to be leased to a user and used by that user to conduct blockchain transactions. A blockchain address in an allocated state (also referred to as an allocated blockchain address) is generally one in which the blockchain address is currently leased to a user and thus may not be leased to another user. A blockchain address in a grace period state (also referred to as a grace period blockchain address) is one in which the blockchain address is not leased to a user, but is available to be leased again by the last user that leased the blockchain address, and is not yet available to be leased to other users. Beneficially, a grace period state allows for a blockchain transaction to complete on the blockchain, before allowing the blockchain address to be leased to another user. Furthermore, a grace period blockchain address may be re-leased to the immediately prior user, for example, when there is not a blockchain address in the idle state 202 for lease to the user. By re-leasing a blockchain address in the grace period state, additional blockchain addresses are available for lease, and fewer additional blockchain addresses may be generated, as discussed below with respect to FIGS. 3 and 4. As shown at arrow 203, upon leasing a blockchain address in idle state 202 to a user, the state of the blockchain address transitions to allocated state 204.

As shown at arrow 205, upon the lease of a blockchain address expiring, the state of the blockchain address transitions to a grace period state 206. As above, in grace period state 206, the blockchain address is available for lease only to the immediate prior user, and no other users. This grace period thus helps to avoid any confusion, disputes, or the like with addresses being used by different users before a transaction is completed, for example.

A lease to a blockchain address may expire based on one or more factors associated with the lease, such as, for example, the time period of the lease. The lease to the blockchain address may also expire based on one or more factors associated with the blockchain address, such as the type of blockchain for which the blockchain address is allocated, the type of transaction to be performed with the blockchain address, the activity level of the blockchain for which the blockchain address is allocated, and others. Additionally, the lease of the blockchain address may expire based on the duration of the transaction, for example, by receiving an indication the transaction has completed on the blockchain. Further, the lease of the blockchain address may expire based on one or more factors associated with a user, for example, user preferences, such as a user lease period, a user activity level, and the like.

In some embodiments, the user may be notified of expiration of the lease. For example, a user may receive a notification or indication of expiration of the lease, such as from the blockchain address lease service 108 in FIG. 1. In some embodiments, a blockchain address may be removed from a user's wallet upon expiration of the lease.

As shown at arrow 207, during grace period state 206, the immediate prior user that leased the blockchain address (e.g., while in allocated state 204) may request to re-lease the blockchain address. If this occurs, then the blockchain address returns to the allocated state 204.

As shown at arrow 209, upon the grace period expiring, the state of the blockchain address may return to idle state 202.

A grace period may be set to expire in various ways. For example, the blockchain address may remain in grace period state 206 while a blockchain transaction completes. In some embodiments, the blockchain associated with the blockchain address may be monitored (e.g., by blockchain address lease service 108 of FIG. 1) to determine when the transaction performed using the blockchain address is complete. In some embodiments, a smart contract associated with the transaction may be configured to send a notification of the completed transaction to a monitoring agent, such as blockchain address lease service 108 of FIG. 1.

Note that state transition diagram 200 is just one example, and other transition diagrams having additional, fewer, alternative, or different states may be implemented.

Example Flowchart for Leasing Blockchain Addresses

Figure 3:
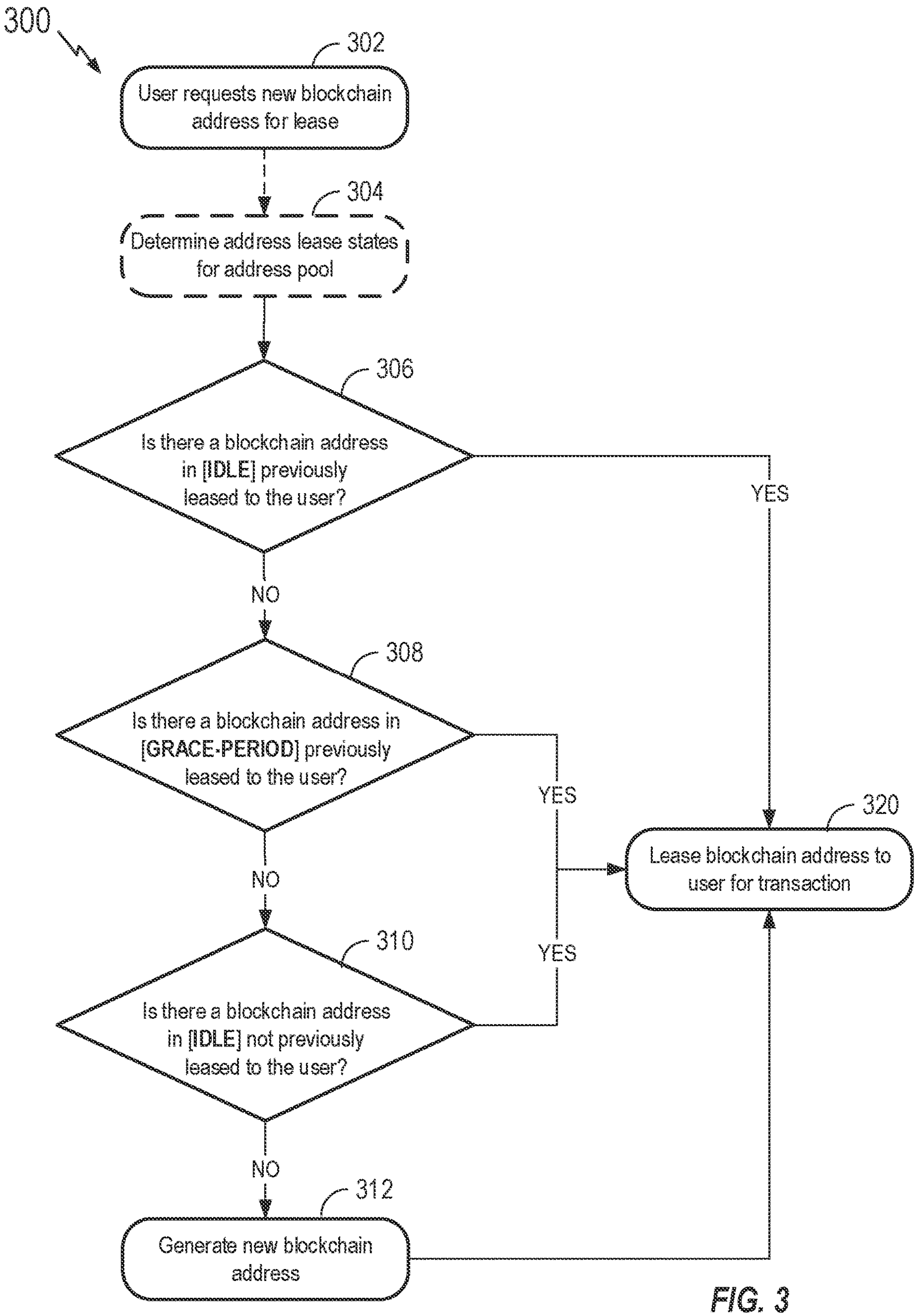
FIG. 3 depicts an example process flow for determining a blockchain address to lease to a user.

FIG. 3 depicts an example process flow 300 for determining a blockchain address to lease to a user. In some examples, process flow 300 may be executed by blockchain address lease service 108 in FIG. 1 and/or by aspects of processing system 700, described below with respect to FIG. 6.

Initially, process flow 300 begins at step 302 with a user (e.g., merchant 104 of FIG. 1) requesting a new blockchain address in order to conduct a blockchain-based transaction. In some embodiments, the request may indicate a type of blockchain network for which the address is to be used. In some embodiments, process flow 300 optionally proceeds to step 304 with determining an available blockchain address based on the blockchain address state associated with each blockchain address.

Process flow 300 then proceeds to step 306 with determining if there is a blockchain address in the idle state, such as idle state 202 in FIG. 2, which was previously leased to the requesting user. Selecting a blockchain address which was previously leased to the requesting user may reduce discrepancies in the recipient of a transaction, such as where the blockchain address has been previously leased to multiple users.

If a blockchain address in the idle state has been previously leased to the requesting user, then that blockchain address is selected for lease to the requesting user, and process flow 300 proceeds to step 320.

If there is not a blockchain address in the idle state that has been previously leased to the requesting user, then process flow 300 proceeds to step 308 with determining if there is a blockchain address in a grace period state, such as grace period state 206 in FIG. 2, which was previously leased to the requesting user. As discussed with respect to FIG. 2, a blockchain address in a grace period is only available to be leased by the immediate previous user that leased the blockchain address.

If a blockchain address in the grace period state was last leased to the requesting user, then the blockchain address is selected for lease to the requesting user and process flow 300 proceeds to step 320.

If there is not a blockchain address in the grace period state that was last leased to the requesting user, then process flow 300 proceeds to step 310 with determining if there is a blockchain address in an idle state available for lease to the user that has not previously been leased to the user.

Process flow 300 allows a blockchain address lease pool to be shared by a plurality of users, allowing the users to obtain different blockchain addresses for different blockchain transaction, without needing to generate and maintain multiple blockchain addresses (e.g., in the user's wallet). Furthermore, because the blockchain address lease pool are shared, privacy may be maintained because an aggregation of all the transactions for a particular blockchain address cannot be associated with a single user. Rather, the transactions are associated with the blockchain address leasing service (e.g., blockchain address lease service 108 in FIG. 1), which may be used by many users.

If there is a blockchain address in the idle state, then that blockchain address is selected for lease to the requesting user, and process flow 300 proceeds to step 320.

If there is not a blockchain address in the idle state, then process flow 300 proceeds to step 312 with generating a new blockchain address to be leased to the requesting user, and process flow 300 proceeds to step 320. A new blockchain address may be generated based on the blockchain type requested by the user.

At step 320, the blockchain address is leased to the requesting user. In some embodiments, the state of the blockchain address is set to allocated, such as allocated state 204 in FIG. 2.

Note that process flow 300 is just one example, and other flows including fewer, additional, or alternative steps, consistent with this disclosure, are possible.

Example Process Flow for Maintaining a Blockchain Address Lease Pool

Figure 4:
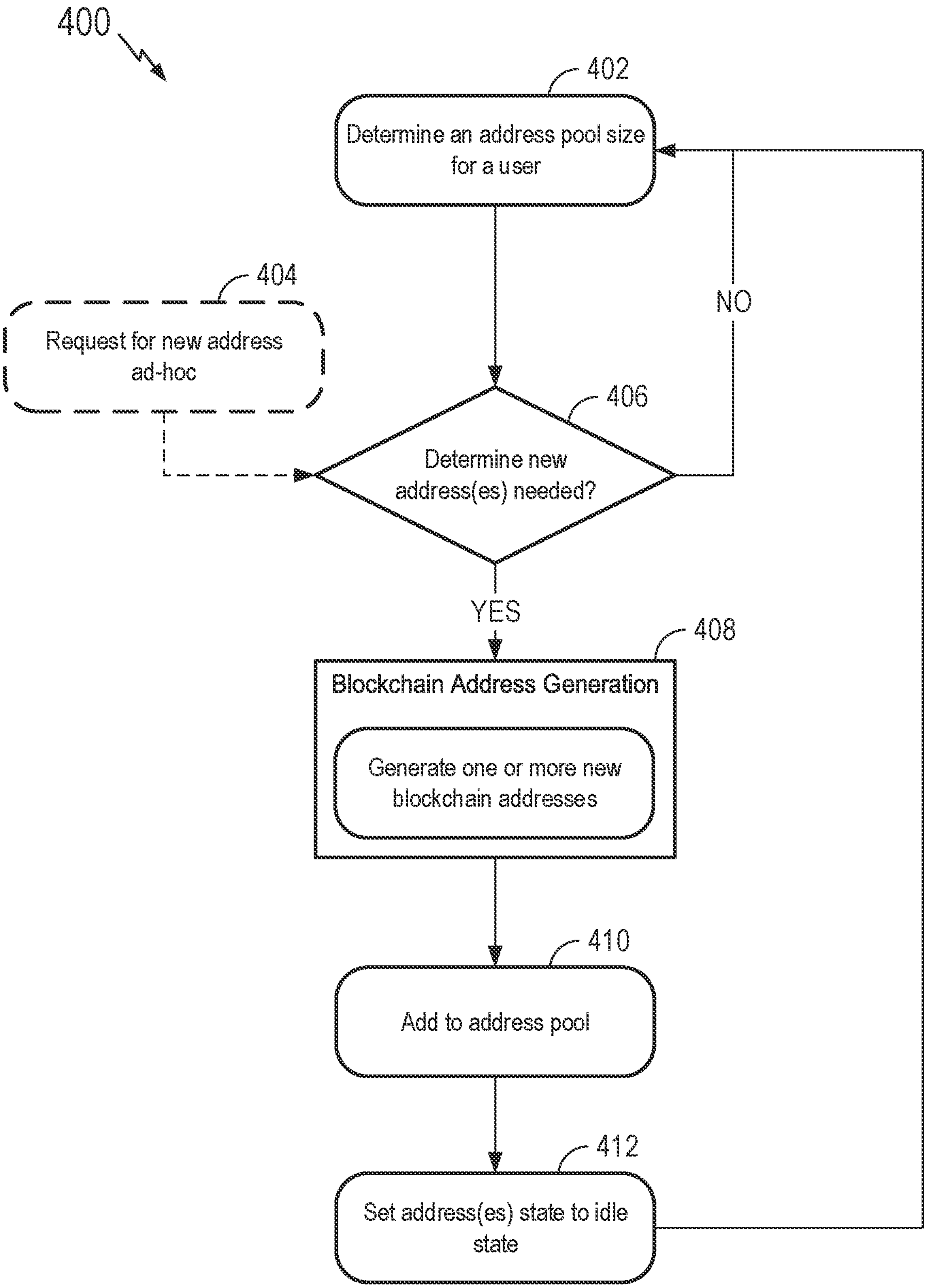
FIG. 4 depicts an example process flow for maintaining adequate blockchain addresses available for lease.

FIG. 4 depicts an example process flow 400 for maintaining a pool of blockchain addresses available for lease. In some embodiments, process flow 400 may be performed as (or part of) step 312 of FIG. 3. In embodiments, aspects of process flow 400 may be performed by blockchain address lease service 108 in FIG. 1 and/or by processing system 700 of FIG. 7.

Initially, process flow 400 begins at step 402 with determining an address pool size for a user or a group of users. An address pool size generally refers to a number of blockchain addresses in the address pool that may be leased to one or more users. In some embodiments, an address pool may be shared by one or more users. Thus, the address pool size for a shared address pool may be based on factors associated with each of the users sharing the address pool.

In some embodiments, an address pool size may be based on one or more factors associated with a user, for example, an expected number of blockchain transactions, the type of blockchain used for blockchain transactions, average blockchain transaction amounts over different time intervals, etc. For example, where a user expects to perform a large number of blockchain transactions in a given period, the address pool size may be configured large enough to ensure sufficient (or some threshold level of) availability of blockchain addresses. In another example, where blockchain transactions on a given blockchain network have a longer transaction completion time, the address pool size may be increased to ensure sufficient (or some threshold level of) availability of blockchain addresses available for lease.

In some embodiments, an address pool size may be based on a ratio of addresses in one or more states. For example, a ratio of the number of addresses in an allocated state (e.g., allocated state 204 in FIG. 2) to the total number of addresses in the pool. The ratio may be, for example, from about 50% to 80% of addresses in an allocated state.

In some embodiments, an address pool size may be based on factors associated with address generation, such as a cost of generating new addresses, an amount of processing resources and/or time for generating the new addresses, etc. Where the resource costs of generating a new address are high (either transiently or consistently), the address pool size may be relatively smaller. In some embodiments, an address pool size may be based on a number of requests for new addresses, for example, received at step 404.

In some embodiments, flow 400 includes optional step 404, wherein a request is received for generating a new address, such as at step 312 of FIG. 3. In some embodiments, process flow 400 proceeds directly to step 406.

At step 406, process flow 400 proceeds with determining whether one or more new blockchain addresses are needed.

In some embodiments, the one or more new blockchain addresses are needed in response to a user request, such as described at step 312 of FIG. 3. For example, where there are no available blockchain addresses, such as when there is not a blockchain address in an idle state or a grace period state for the user, as described with respect to FIG. 3.

In some embodiments, the one or more new blockchain addresses are needed based on the determined address pool size at step 402 (e.g., if the determined address pool size is larger than the current address pool size).

If one or more new blockchain addresses are not needed, for example, where the determined address pool size is smaller than, or equal to the current address pool size, then process flow 400 returns to step 402 with determining the address pool size.

If one or more new blockchain addresses are needed, then process flow 400 proceeds to step 408 with generating the one or more new blockchain addresses. In one example, a blockchain address may be generated using a public key and private key pair, through cryptographic hashing. Generally, a blockchain address may be generated for use with a specific blockchain, such as for a Bitcoin™, Ethereum™, Xerium, or other type of blockchain.

Process flow 400 then proceeds to step 410 with adding the one or more new blockchain addresses to the address pool.

Process flow 400 then proceeds to step 412 with setting the one or more new blockchain addresses to an idle state.

Process flow 400 may then return to step 402, to re-determine the address pool size to maintain an adequate supply of blockchain addresses for leasing to a user.

Note that process flow 400 is just one example, and other flows including fewer, additional, or alternative steps, consistent with this disclosure, are possible.

Example Method for Leasing a Blockchain Address

Figure 5:
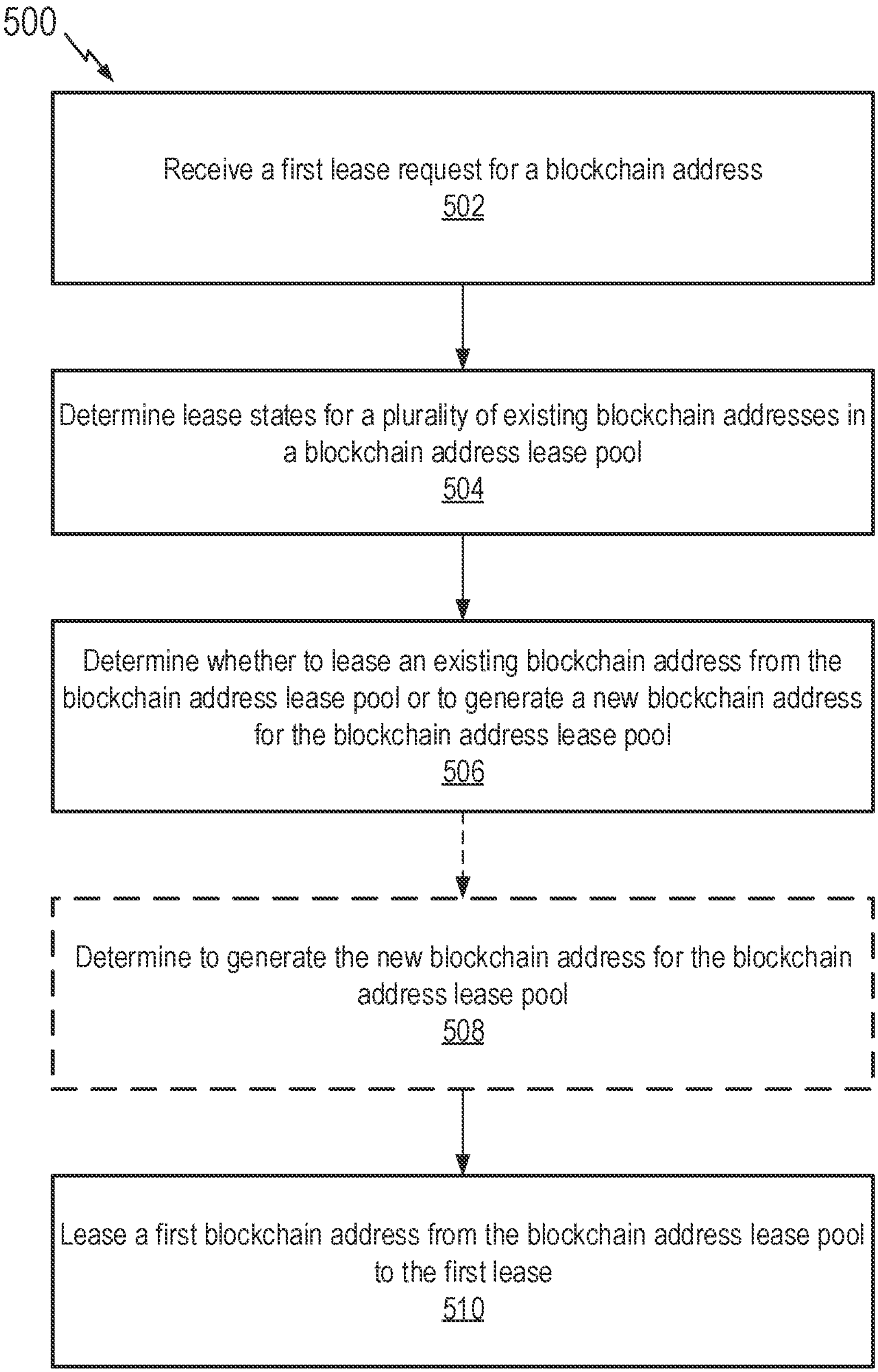
FIG. 5 depicts an example method for leasing a blockchain address to a user.

FIG. 5 depicts an example method 500 for leasing a blockchain address to a user. In embodiments, aspects of method 500 may be performed by blockchain address lease service 108 in FIG. 1 and/or by processing system 700 of FIG. 7.

Initially, method 500 begins at step 502 with receiving, from a first user, such as merchant 104 in FIG. 1, a first lease request for a blockchain address. The leased blockchain address is configured to receive a blockchain transaction on behalf of the first user, such as described with respect to step 302 in FIG. 3. In some cases, the leased blockchain address may be monitored by a blockchain address lease service, such as blockchain address lease service 108 in FIG. 1. In some cases, the leased blockchain address may be associated with a wallet for the first user, whereby the first user may monitor the leased blockchain address.

Method 500 proceeds to step 504 with determining lease states for a plurality of existing blockchain addresses in a blockchain address lease pool, for example, the blockchain address pool generated and maintained in process flow 400 in FIG. 4. In embodiments, the lease states may be those described with respect to state transition diagram 200 in FIG. 2.

At step 506, based on the determined lease states, method 500 proceeds with determining whether to lease an existing blockchain address from the blockchain address lease pool or to generate a new blockchain address for the blockchain address lease pool.

In some embodiments, method 500 optionally proceeds to step 508 with determining to generate the new blockchain address for the blockchain address lease pool, wherein the blockchain address is the new blockchain address, such as described with respect to step 312 in FIG. 3. In some embodiments, method 500 further comprises generating the new blockchain address for the blockchain address lease pool.

Method 500 then proceeds to step 510 with leasing a first blockchain address from the blockchain address lease pool to the first user, such as at step 320 in FIG. 3.

In some embodiments, method 500 further comprises setting a lease state for the first blockchain address to an allocated state, wherein the allocated state prevents the first blockchain address from being leased to another user for a configured lease period, for example, allocated state 204 in FIG. 2.

In some embodiments, method 500 further comprises setting the lease state for the first blockchain address to a grace period state after expiration of the configured lease period, for example, as described with respect to setting the lease state to grace period state 206 following the lease expiration for allocated state 204 in FIG. 2.

In some embodiments, the grace period state prevents the first blockchain address from being leased to any user other than the user that most recently leased the blockchain address for the configured grace period, such as described with respect to grace period state 206 in FIG. 2.

In some embodiments, method 500 further comprises setting the lease state for the first blockchain address to an idle state after an expiration of the configured grace period, for example, as described with respect to setting the lease state to idle state 202 following the grace period expiration for grace period state 206 in FIG. 2.

In some embodiments, method 500 further comprises receiving an indication of completion of the blockchain transaction using the first blockchain address. In some embodiments, expiration of a grace period may be based on receiving the indication of completion of the blockchain transaction using the first blockchain address.

In some embodiments, method 500 further comprises determining to lease the existing blockchain address from the blockchain address lease pool, wherein the existing blockchain address is one of the plurality of existing blockchain addresses in the blockchain address lease pool.

In some embodiments, determining to lease the existing blockchain address from the blockchain address lease pool, comprises selecting the existing blockchain address from the plurality of existing blockchain addresses in the blockchain address lease pool based on a lease state for the existing blockchain address being an idle state, such as described with respect to step 306 or step 310 in FIG. 3.

In some embodiments, determining to lease the existing blockchain address from the blockchain address lease pool, comprises selecting the existing blockchain address from the plurality of existing blockchain addresses in the blockchain address lease pool based on a lease state for the existing blockchain address being a grace period state and the existing blockchain address having received a previous blockchain transaction on behalf of the first user, such as described with respect to step 308 in FIG. 3.

In some embodiments, method 500 further comprises receiving, from a second user, a second lease request for a second blockchain address configured to receive a second blockchain transaction on behalf of the second user; determining a lease state for the second blockchain address is in an idle state; and leasing the second blockchain address to the second user, such as described with respect to step 310 in FIG. 3. For example, the blockchain address may be selected from an idle state, where the blockchain address was previously leased to another user, for lease to a subsequent user. Beneficially, the blockchain address lease pool may be shared by multiple users.

In some embodiments, method 500 further comprises determining a pool size for the blockchain address lease pool, such as described with respect to step 402 in FIG. 4; determining the plurality of existing blockchain addresses has fewer blockchain addresses than the pool size, such as described with respect to step 406 in FIG. 4; generating a batch of new blockchain addresses for the blockchain address lease pool such that the blockchain address lease pool has a number of blockchain addresses equal to the pool size, such as described with respect to step 408 in FIG. 4; and setting a lease state for the batch of new blockchain addresses to an idle state, such as described with respect to step 412 in FIG. 4.

Note that method 500 is just one example, and other flows including fewer, additional, or alternative steps, consistent with this disclosure, are possible.

Another Example Method for Leasing a Blockchain Address

Figure 6:
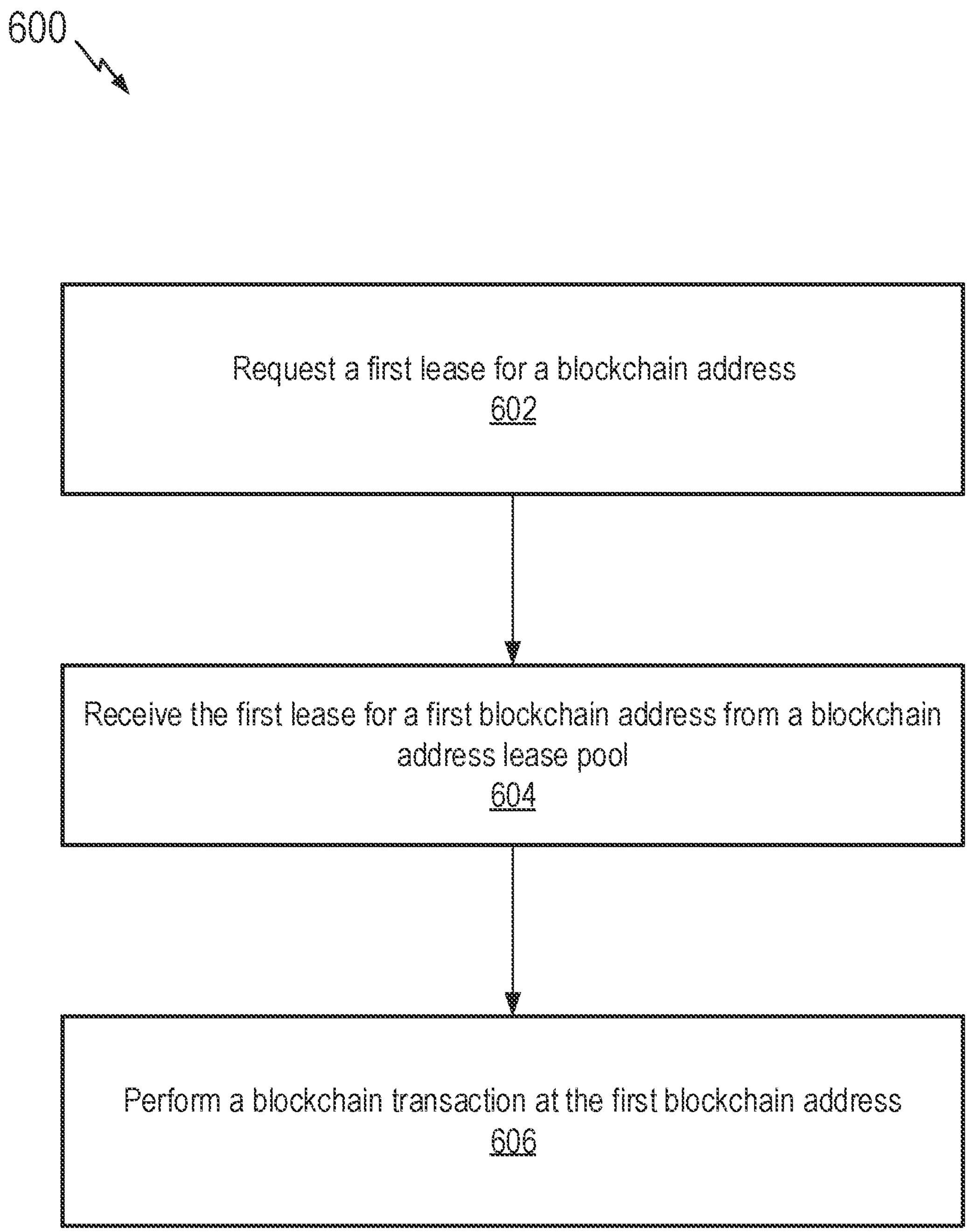
FIG. 6 depicts another example method for leasing a blockchain address to a user.

FIG. 6 depicts an example method 600 for requesting and receiving a lease of a blockchain address by a user. In embodiments, aspects of method 600 may be performed by merchant 104 in FIG. 1 and/or by processing system 800 of FIG. 8.

Method 600 begins at step 602 with requesting, by a first user, such as merchant 104 in FIG. 1, a first lease for a blockchain address. The leased blockchain address is configured to receive a blockchain transaction on behalf of the first user, such as described with respect to step 302 in FIG. 3. In some embodiments, the request for the first lease comprises an indication of a blockchain network associated with the blockchain address.

Method 600 proceeds to step 604 with receiving the first lease for a first blockchain address from a blockchain address lease pool, such as described at step 320 in FIG. 3.

Method 600 then proceeds to step 606 with performing a blockchain transaction at the first blockchain address. In some embodiments, method 600 further comprises receiving an indication of completion of the blockchain transaction using the first blockchain address.

In some embodiments, the first lease for the first blockchain address expires after a configured lease period, for example, at allocated state 204 in FIG. 2. In some embodiments, method 600 further comprises receiving an indication of expiration of the lease for the first blockchain address after the configured lease period expires.

In some embodiments, method 600 further comprises receiving an indication that the first blockchain address is associated with a first user's wallet, whereby the first user may receive a blockchain transaction at the first blockchain address with the first user's wallet.

In some embodiments, method 600 further comprises receiving an indication that the first blockchain address was removed from the first user's wallet, whereby the first user may no longer receive a subsequent blockchain transaction with the first blockchain address.

In some embodiments, the first blockchain address was previously leased to the first user, such as described with respect to step 306 or 308 in FIG. 3.

In some embodiments, the first blockchain address is a generated new blockchain address, such as described with respect to step 312 in FIG. 3.

Note that method 600 is just one example, and other flows including fewer, additional, or alternative steps, consistent with this disclosure, are possible.

Example Processing Systems for Managing Blockchain Addresses

Figure 7:
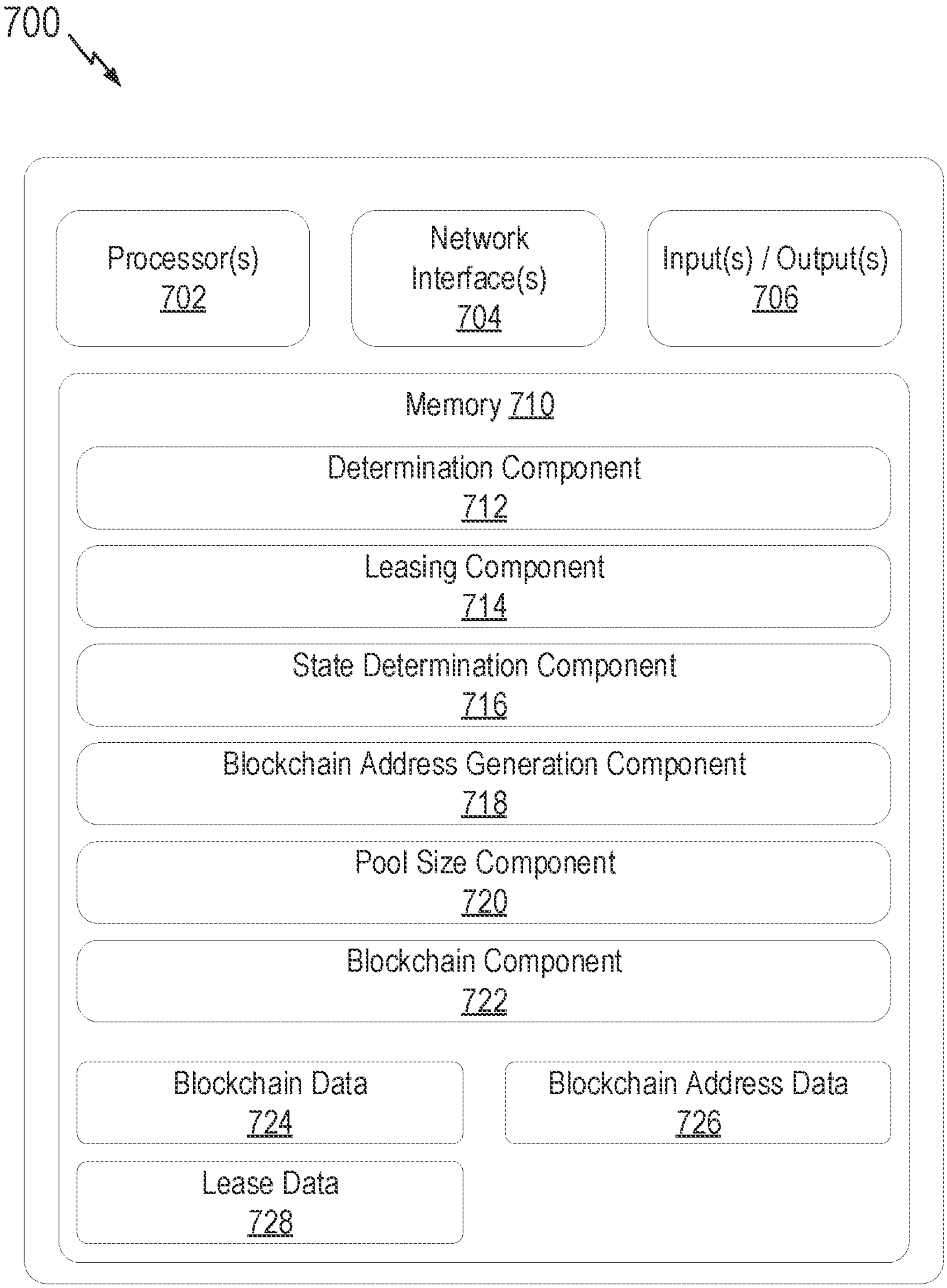
FIGS. 7-8 depict example processing systems configured for performing various aspects described herein.

FIG. 7 depicts an example processing system configured for performing various aspects described herein, for example, state transition diagram 200 discussed with respect to FIG. 2, process flow 300 discussed with respect to FIG. 3, process flow 400 discussed with respect to FIG. 4, or method 500 discussed with respect to FIG. 5.

Processing system 700 includes one or more processors 702. Generally, processor(s) 702 may be configured to execute computer-executable instructions (e.g., software code) to perform various functions, as described herein.

Processing system 700 further includes one or more network interfaces 704, which generally provide data access to any sort of data network, including personal area networks (PANs), local area networks (LANs), wide area networks (WANs), the Internet, and the like. In some cases, network interface(s) 704 provide access to blockchain networks, including source and destination blockchain networks, such as described above.

Processing system 700 further includes input(s) and output(s) 706, which generally provide means for providing data to and from processing system 700, such as via connection to computing device peripherals, including user interface peripherals.

Processing system further includes a memory 710 configured to store various types of components and data. In this example, memory 710 includes a determination component 712, a leasing component 714, a state determination component 716, a blockchain address generation component 718, a pool size component 720, a blockchain component 722, blockchain data 724, blockchain address data 726, and lease data 728.

In some embodiments, determination component 712 is configured to make determinations, for example, determine a blockchain address for a lease such as described with respect to steps 306-310 in FIG. 3 or step 504 in FIG. 5, determine to generate a new blockchain address, and the like, such as described with respect to step 312 in FIG. 3, or step 406 in FIG. 4.

In some embodiments, leasing component 714 is configured to manage leasing of blockchain addresses, for example by receiving a lease request from a user, such as described with respect to step 302 in FIG. 3, or step 502 in FIG. 5, and leasing a blockchain address to a requesting user, such as described with respect to step 320 in FIG. 3, or step 508 in FIG. 5. Leasing component 714 may store lease data 728 associated with leasing of blockchain addresses, including lease requests, lease terms, expiration terms, the leased blockchain address, etc.

In some embodiments, state determination component 716 is configured to manage the state of blockchain addresses in the pool, for example, determine and set blockchain address states, and transition blockchain addresses between states, such as described with respect to FIG. 2, steps 304-312 in FIG. 3, or step 504 in FIG. 5. The state of blockchain addresses and the blockchain address lease pool may form part of blockchain address data 726.

In some embodiments, blockchain address generation component 718 is configured to generate new blockchain addresses, for example, generate a new batch of blockchain addresses, and generate a new blockchain address when there is not a blockchain address available for lease, such as described with respect to FIG. 4. The generated blockchain addresses may be added to a blockchain address lease pool, as part of blockchain address data 726.

In some embodiments, pool size component 720 is configured to manage the pool size for the blockchain address lease pool, for example, by determining the pool size, determining a new pool size, and determining the current number of existing blockchain addresses is less than the pool size, such as described with respect to step 406 in FIG. 4.

In some embodiments, blockchain component 722 is configured to interact with a blockchain network, such as to receive blockchain transactions at one or more blockchain addresses, such as those leased to users, on behalf of the users, such as described with respect to blockchain network 106 in FIG. 1 and may store data associated with said interactions as blockchain data 724.

Processing system 700 may be implemented in various ways. For example, processing system 700 may be implemented within on-site, remote, or cloud-based processing equipment.

Note that while depicted as a single processing system in FIG. 7, aspects of processing system 700 may be distributed among a plurality of processing systems. For example, each of the steps of method 500 described above with respect to FIG. 5 may be performed on a separate processing system (not depicted).

Processing system 700 is just one example, and other configurations are possible. For example, in alternative embodiments, aspects described with respect to processing system 700 may be omitted, added, or substituted for alternative aspects.

Figure 8:
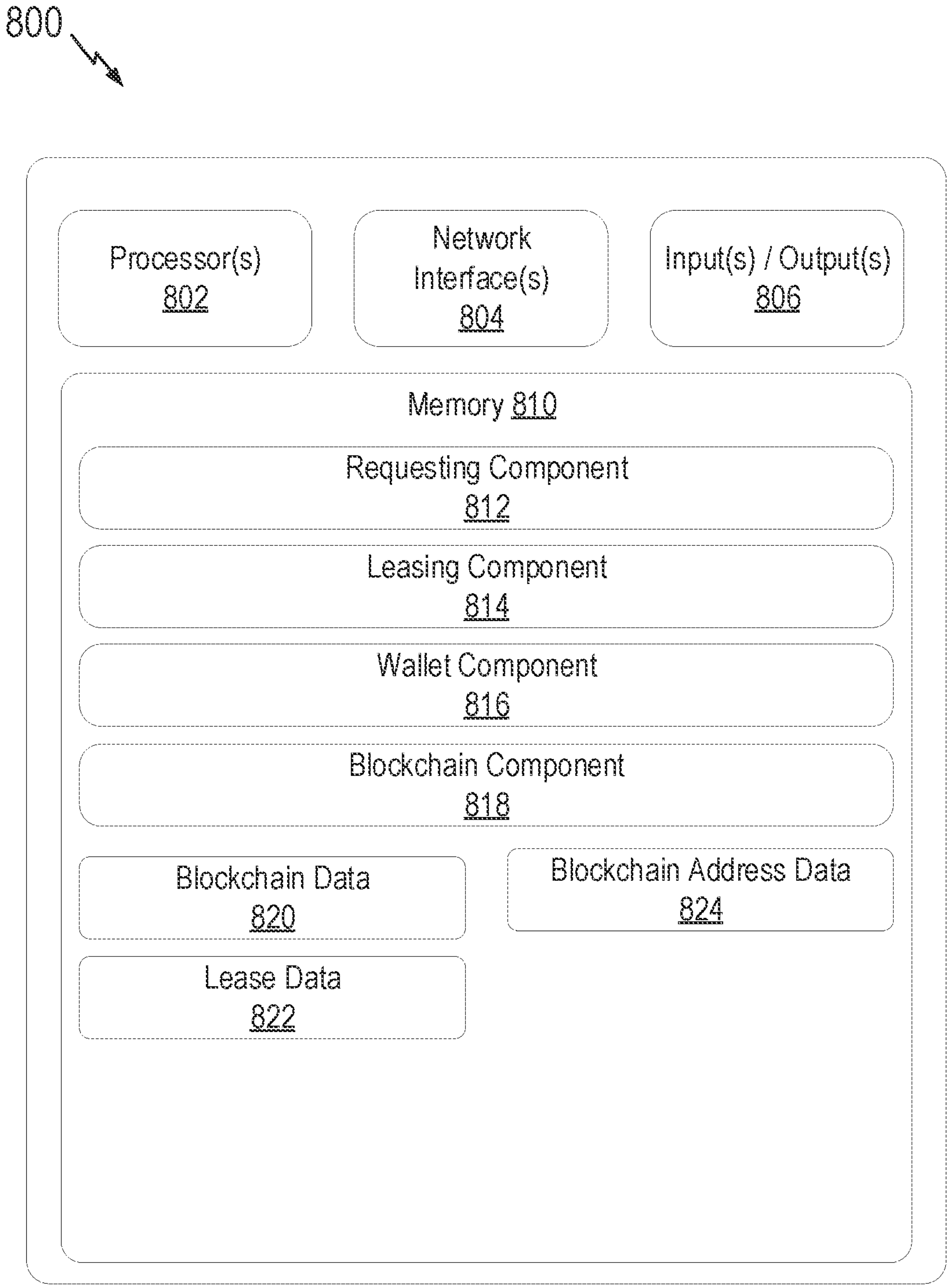

FIG. 8 depicts an example processing system configured for performing various aspects described herein, for example, method 600 discussed with respect to FIG. 6.

Processing system 800 includes one or more processors 802. Generally, processor(s) 802 may be configured to execute computer-executable instructions (e.g., software code) to perform various functions, as described herein.

Processing system 800 further includes one or more network interfaces 804, which generally provide data access to any sort of data network, including personal area networks (PANs), local area networks (LANs), wide area networks (WANs), the Internet, and the like. In some cases, network interface(s) 804 provide access to blockchain networks, including source and destination blockchain networks, such as described above.

Processing system 800 further includes input(s) and output(s) 806, which generally provide means for providing data to and from processing system 800, such as via connection to computing device peripherals, including user interface peripherals.

Processing system further includes a memory 810 configured to store various types of components and data. In this example, memory 810 includes a requesting component 812, a leasing component 814, a wallet component 816, a blockchain component 818, blockchain data 820, blockchain address data 824, and lease data 822.

In some embodiments, requesting component 812 is configured to make requests, for example, request a blockchain address for a lease such as described with respect to step 602 in FIG. 6.

In some embodiments, leasing component 814 is configured to manage leasing of blockchain addresses, for example by receiving a lease from a blockchain address leasing service, such as described with respect to blockchain address lease service 108 in FIG. 1, step 604 in FIG. 6, or step 320 in FIG. 3. Leasing component 814 may store lease data 822 associated with leasing of blockchain addresses, including lease requests, lease terms, expiration terms, the leased blockchain address, etc.

In some embodiments, wallet component 816 is configured to manage blockchain addresses, such as a leased blockchain address, and configured to send, receive, and hold blockchain assets, such as on behalf of a user (e.g., merchant 104 in FIG. 1). Wallet component 816 may be further configured to store blockchain address data 824 for managed blockchain addresses.

In some embodiments, blockchain component 818 is configured to interact with a blockchain network, such as to receive blockchain transactions at one or more blockchain addresses, such as those leased to users, on behalf of the users, such as described with respect to blockchain network 106 in FIG. 1.

Processing system 800 may be implemented in various ways. For example, processing system 800 may be implemented within on-site, remote, or cloud-based processing equipment.

Note that while depicted as a single processing system in FIG. 8, aspects of processing system 800 may be distributed among a plurality of processing systems. For example, each of the steps of method 600 described above with respect to FIG. 6 may be performed on a separate processing system (not depicted).

Processing system 800 is just one example, and other configurations are possible. For example, in alternative embodiments, aspects described with respect to processing system 800 may be omitted, added, or substituted for alternative aspects.

Example Clauses

Implementation examples are described in the following numbered clauses:

Clause 1: A method, comprising: receiving, from a first user, a first lease request for a blockchain address configured to receive a blockchain transaction on behalf of the first user; determining lease states for a plurality of existing blockchain addresses in a blockchain address lease pool; based on the determined lease states, determining whether to lease an existing blockchain address from the blockchain address lease pool or to generate a new blockchain address for the blockchain address lease pool; and leasing a first blockchain address from the blockchain address lease pool to the first user.

Clause 2: The method of Clause 1, further comprising setting a lease state for the first blockchain address to an allocated state, wherein the allocated state prevents the first blockchain address from being leased to another user for a configured lease period.

Clause 3: The method of any one of Clauses 1-2, further comprising setting the lease state for the first blockchain address to a grace period state after an expiration of the configured lease period.

Clause 4: The method of Clause 3, wherein the grace period state prevents the first blockchain address from being leased to another user for a configured grace period and allows the first blockchain address to be leased to the first user for the configured grace period.

Clause 5: The method of Clause 4, further comprising setting a lease state for the first blockchain address to an idle state after an expiration of the configured grace period.

Clause 6: The method of any one of Clauses 1-5, further comprising receiving an indication of completion of the blockchain transaction using the first blockchain address.

Clause 7: The method of any one of Clauses 1-6, further comprising: determining to lease the existing blockchain address from the blockchain address lease pool, wherein the existing blockchain address is one of the plurality of existing blockchain addresses in the blockchain address lease pool.

Clause 8: The method of Clause 7, wherein determining to lease the existing blockchain address from the blockchain address lease pool, comprises selecting the existing blockchain address from the plurality of existing blockchain addresses in the blockchain address lease pool based on a lease state for the existing blockchain address being an idle state.

Clause 9: The method of Clause 6, wherein determining to lease the existing blockchain address from the blockchain address lease pool, comprises selecting the existing blockchain address from the plurality of existing blockchain addresses in the blockchain address lease pool based on a lease state for the existing blockchain address being a grace period state and the existing blockchain address received a previous blockchain transaction on behalf of the first user.

Clause 10: The method of any one of Clauses 1-9, further comprising: determining to generate a new blockchain address for the blockchain address lease pool, wherein the blockchain address is the new blockchain address.

Clause 11: The method of any one of Clauses 1-10, further comprising: receiving, from a second user, a second lease request for a second blockchain address configured to receive a second blockchain transaction on behalf of the second user; determining a lease state for the second blockchain address is in an idle state; and leasing the second blockchain address to the second user.

Clause 12: The method of any one of Clauses 1-11, further comprising: determining a pool size for the blockchain address lease pool; determining the plurality of existing blockchain addresses has fewer blockchain addresses than the pool size; generating a batch of new blockchain addresses for the blockchain address lease pool such that the blockchain address lease pool has a number of blockchain addresses equal to the pool size; and setting a lease state for the batch of new blockchain addresses to an idle state.

Clause 13: A method, comprising: requesting, by a first user, a first lease for a blockchain address; receiving the first lease for a first blockchain address from a blockchain address lease pool; and performing a blockchain transaction at the first blockchain address.

Clause 14: The method of Clause 13, wherein the request for the first lease comprises an indication of a blockchain network associated with the blockchain address.

Clause 15: The method of any one of Clauses 13-14, wherein the first blockchain address is configured to receive a blockchain transaction on behalf of the first user.

Clause 16: The method of any one of Clauses 13-15, wherein the first lease for the first blockchain address expires after a configured lease period.

Clause 17: The method of Clause 16, further comprising receiving an indication of expiration of the lease for the first blockchain address after the configured lease period expires.

Clause 18: The method of any one of Clauses 13-17, further comprising receiving an indication of the first blockchain address is associated with a first user's wallet, whereby the first user may receive a blockchain transaction at the first blockchain address with the first user's wallet.

Clause 19: The method of Clause 18, further comprising receiving an indication the first blockchain address was removed from the first user's wallet, whereby the first user may no longer receive a subsequent blockchain transaction with the first blockchain address.

Clause 20: The method of any one of Clauses 13-19, wherein the first blockchain address was previously leased to the first user.

Clause 21: The method of any one of Clauses 13-20, wherein the first blockchain address is a generated new blockchain address.

Clause 22: A processing system, comprising: a memory comprising computer-executable instructions; and a processor configured to execute the computer-executable instructions and cause the processing system to perform a method in accordance with any one of Clauses 1-21.

Clause 23: A processing system, comprising means for performing a method in accordance with any one of Clauses 1-21.

Clause 24: A non-transitory computer-readable medium storing program code for causing a processing system to perform the steps of any one of Clauses 1-21.

Clause 25: A computer program product embodied on a computer-readable storage medium comprising code for performing a method in accordance with any one of Clauses 1-21.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:

receiving, from a first user, a first lease request for a blockchain address configured to receive a blockchain transaction on behalf of the first user;

determining lease states assigned to a plurality of existing blockchain addresses in a blockchain address lease pool;

based on the determined lease states, generating a new blockchain address for the blockchain address lease pool; and leasing the new blockchain address from the blockchain address lease pool to the first user.

2. The method of claim 1, further comprising assigning an allocated state, as a lease state, to the new blockchain address, wherein the allocated state prevents the new blockchain address from being leased to another user for a configured lease period.

3. The method of claim 2, further comprising assigning a grace period state, as the lease state, to the new blockchain address after an expiration of the configured lease period.

4. The method of claim 3, wherein the grace period state prevents the new blockchain address from being leased to another user for a configured grace period and allows the new blockchain address to be leased to the first user for the configured grace period.

5. The method of claim 4, further comprising assigning an idle state, as the lease state, to the new blockchain address after an expiration of the configured grace period.

6. The method of claim 1, further comprising receiving an indication of completion of the blockchain transaction using the new blockchain address.

7. The method of claim 1, further comprising:

receiving, from a second user, a second lease request for a second blockchain address configured to receive a second blockchain transaction on behalf of the second user;

determining a lease state for the second blockchain address is in an idle state; and leasing the second blockchain address to the second user.

* * * * *